Figure 1:
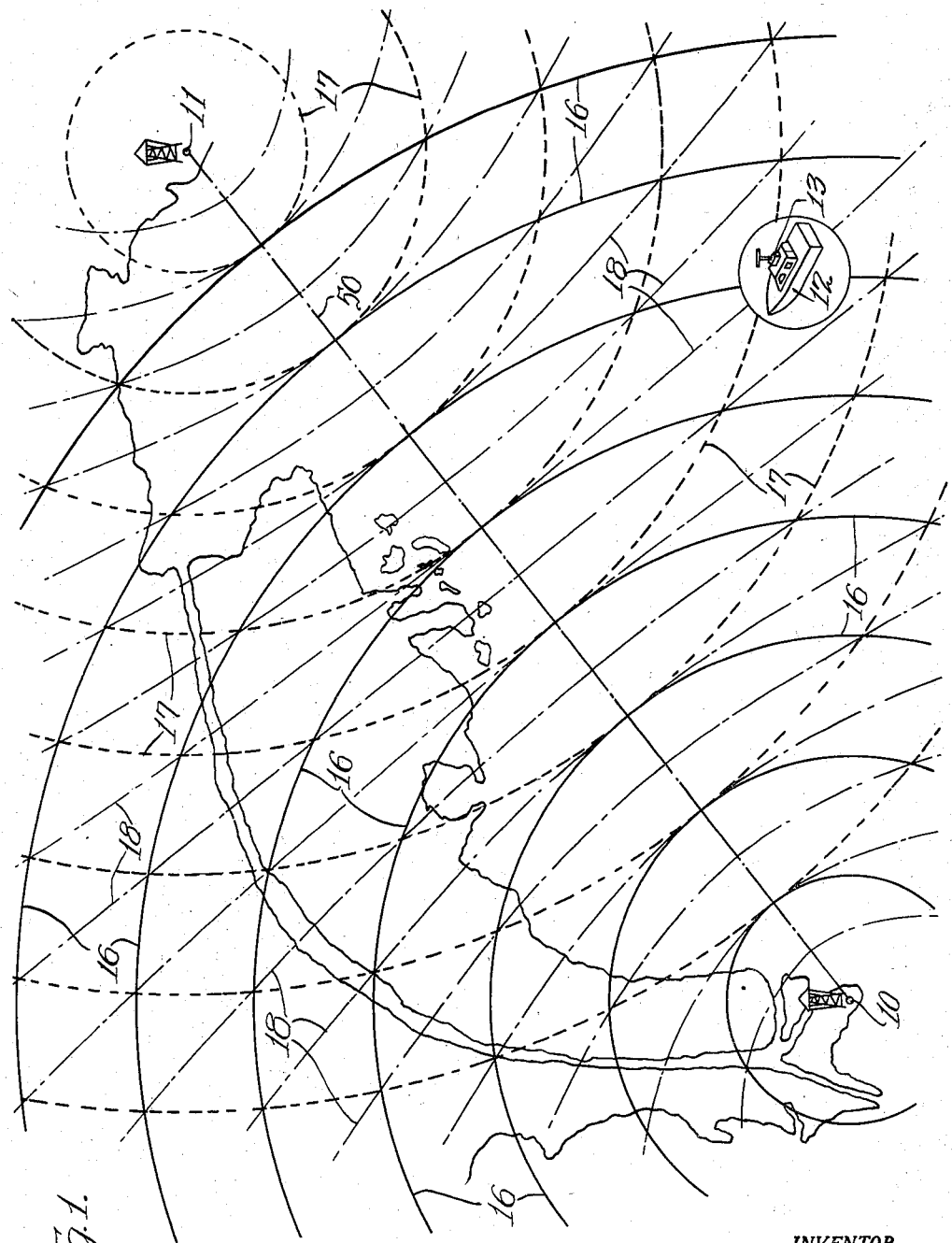

July 15, 1958      J. E. HAWKINS      2,843,846

RADIO LOCATION SYSTEM

Filed Jan. 21, 1954      7 Sheets-Sheet 2

INVENTOR.
James E. Hawkins
BY
Mason, Kolehmainen, Rathburn & Wyss
Attys.

July 15, 1958 J. E. HAWKINS 2,843,846
RADIO LOCATION SYSTEM
Filed Jan. 21, 1954 7 Sheets-Sheet 3

INVENTOR.
James E. Hawkins
BY
Mason, Kolehmainen, Rathburn & Wyss
Attys

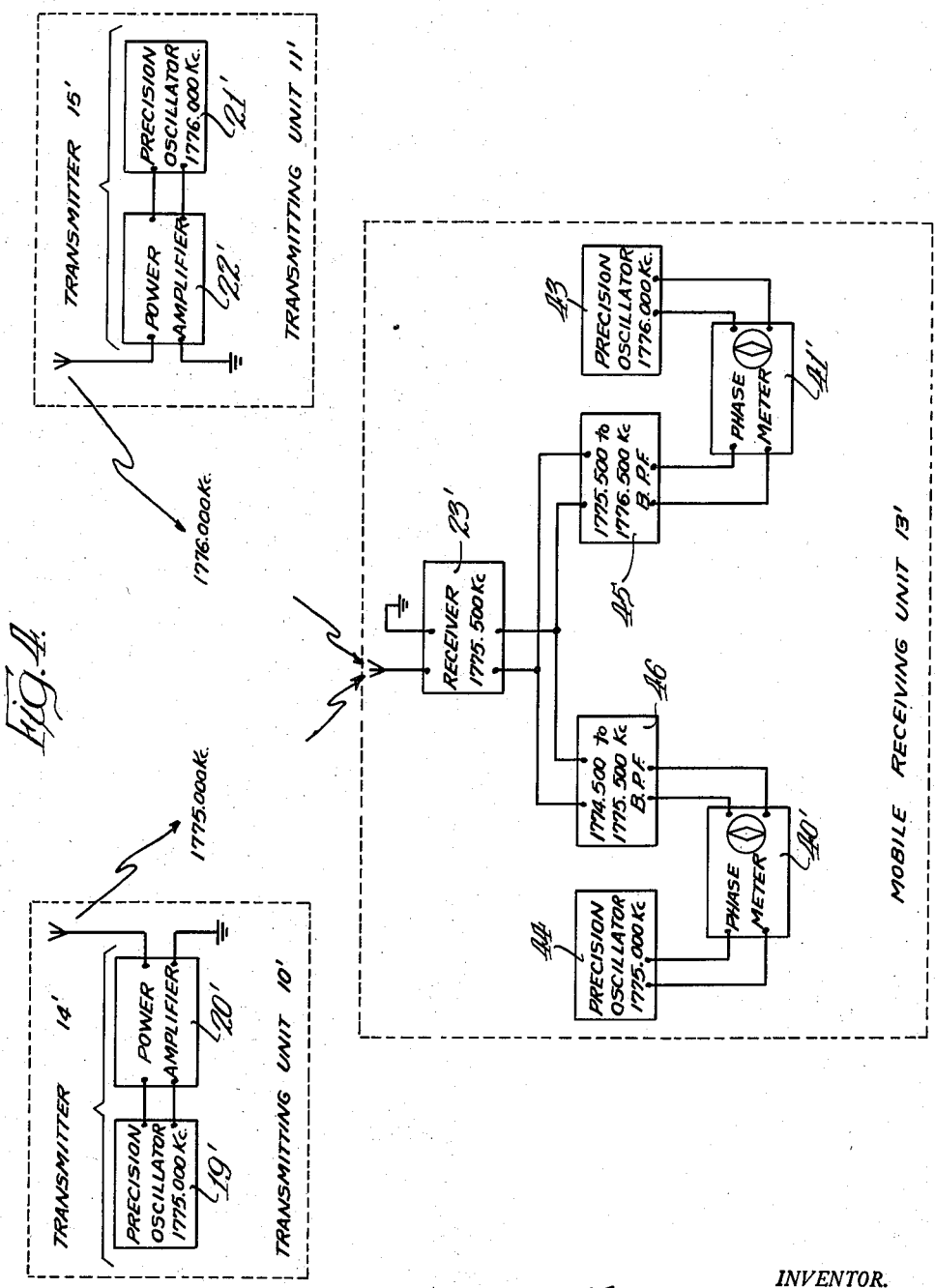

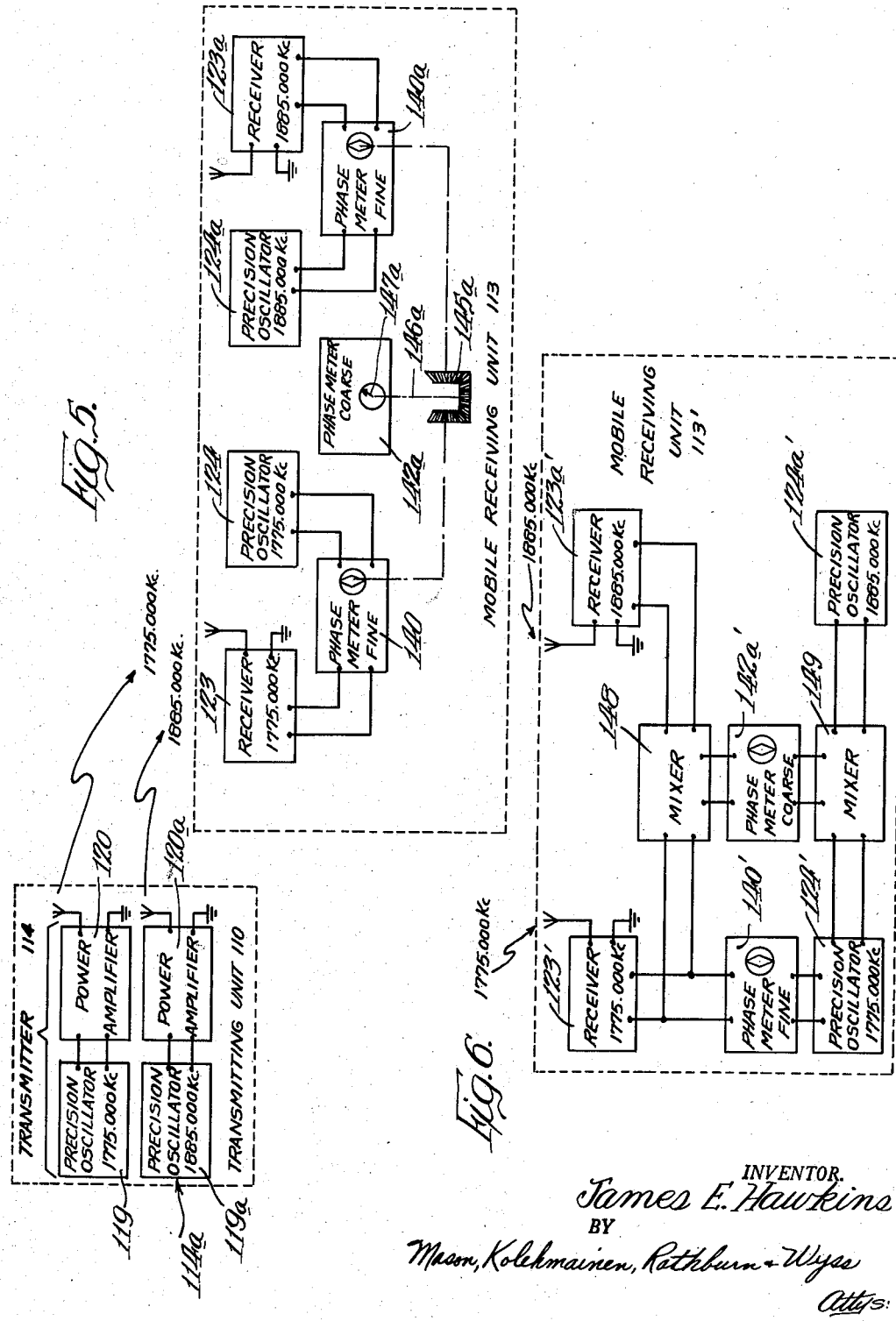

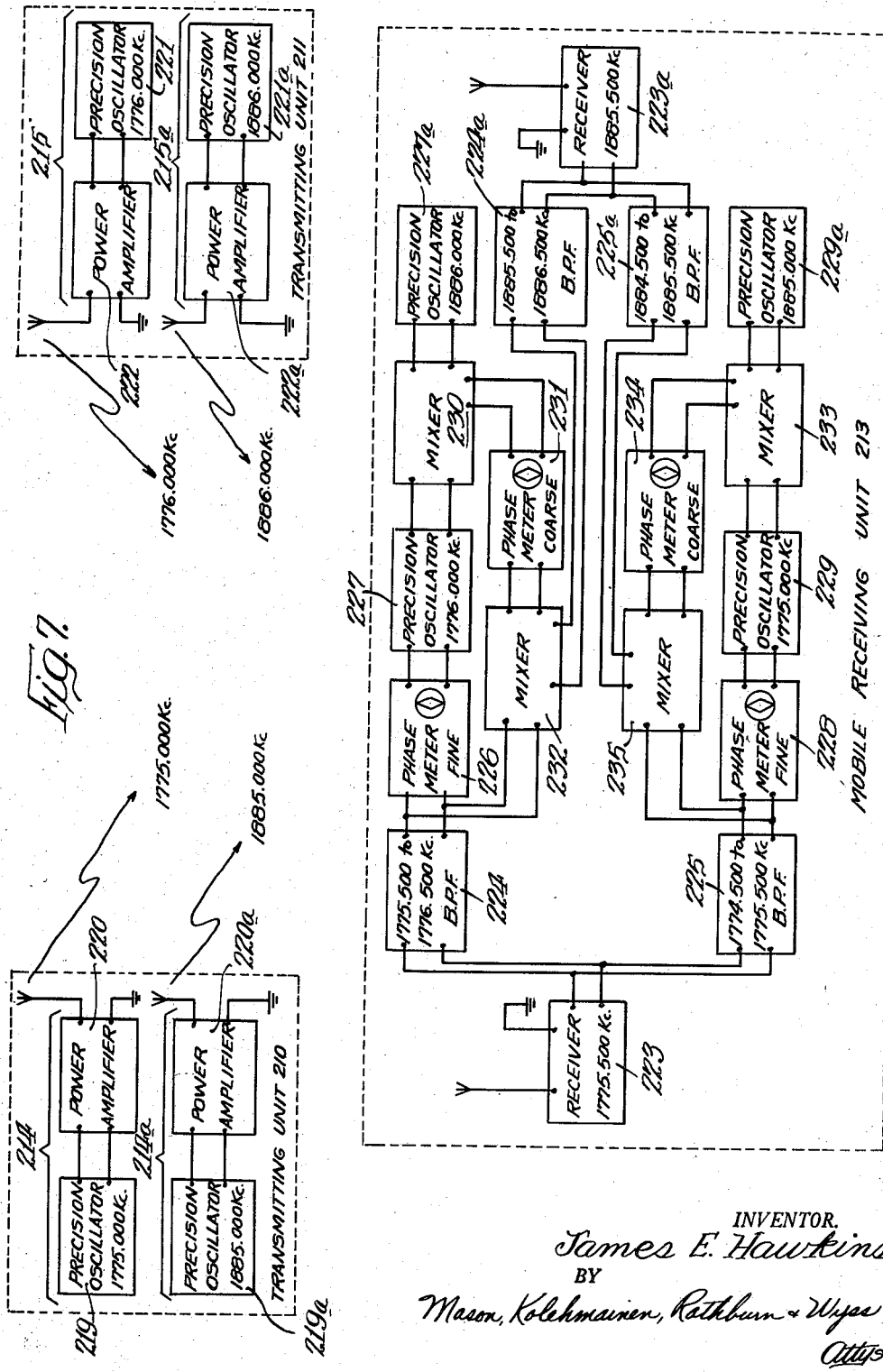

July 15, 1958  J. E. HAWKINS  2,843,846
RADIO LOCATION SYSTEM
Filed Jan. 21, 1954  7 Sheets-Sheet 7
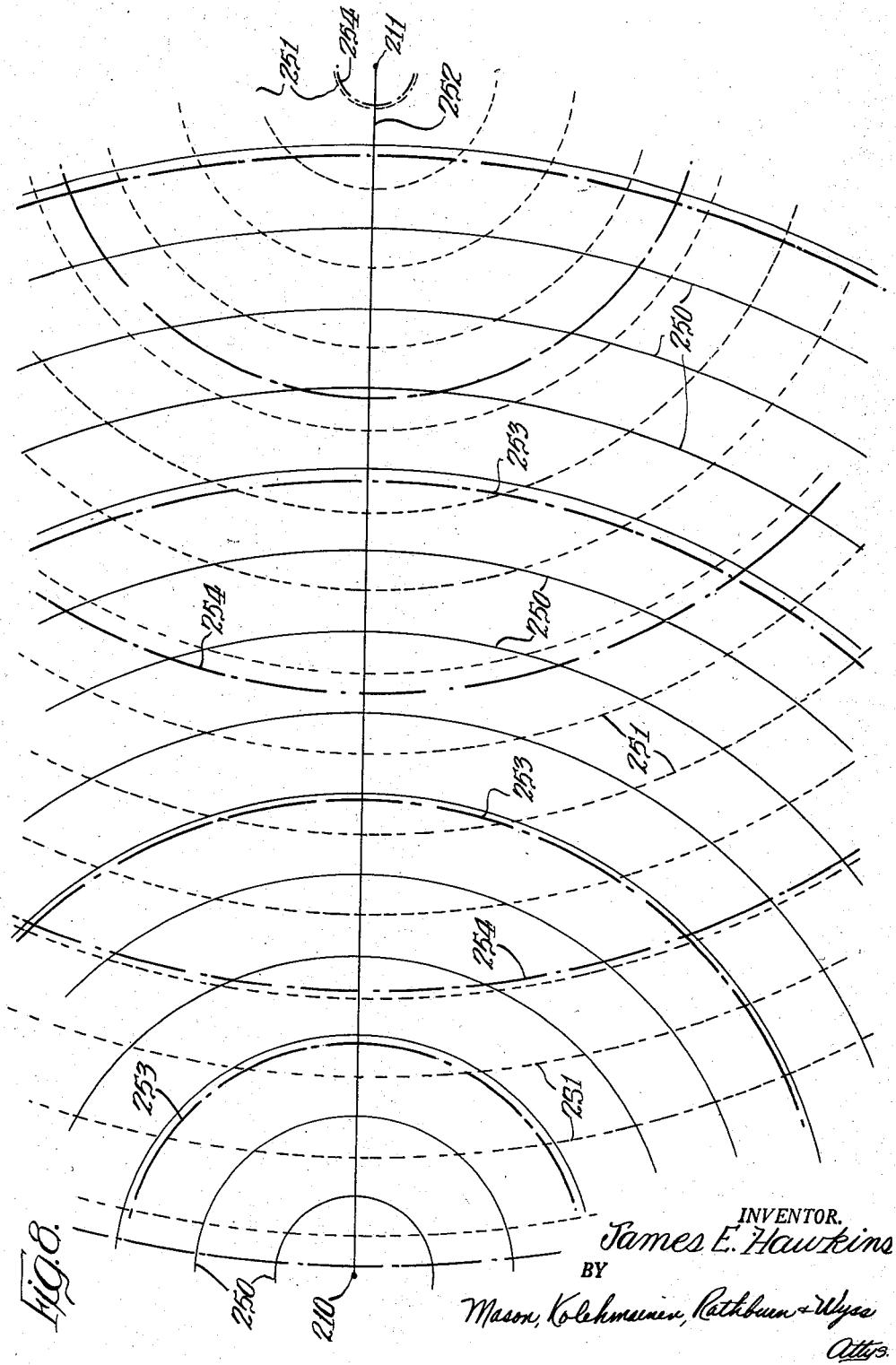
INVENTOR.
James E. Hawkins
BY
Mason, Kolehmainen, Rathburn & Wyss
Attys.

United States Patent Office 2,843,846
Patented July 15, 1958

2,843,846

RADIO LOCATION SYSTEM

James E. Hawkins, Broken Arrow, Okla., assignor to Seismograph Service Corporation, Tulsa, Okla., a corporation of Delaware Application January 21, 1954, Serial No. 405,450

28 Claims. (Cl. 343—105)

The present invention relates to radio position finding systems and more particularly to new and improved radio position finding systems of the type employing phase comparison between signals generated at a mobile receiving point and position indicating signals respectively radiated from at least two spaced transmitting points to provide indications from which the position of the receiving point relative to the known positions of the transmitting points may be determined.

In systems of the particular type referred to, the continuous waves radiated from each of the transmitters at the spaced transmitting points produce standing waves in space, the phase relationship of which when received at a mobile receiving unit changes as a function of changing position of the receiving unit with respect to each of the transmitting points. More specifically, the waves radiated by each of the transmitting units of the system are characterized by isophase lines which are circular in contour about the transmitting point as a center. On a line extending radially from the point of location of the transmitter these isophase lines are spaced apart a distance equal to one wave length of the radiated waves. With this system arrangement, the position of a receiving point relative to a pair of circular isophase lines may be determined by measuring the phase relationship between continuous waves generated at the receiving point and the continuous waves radiated from one of the transmitters.

Since the point of location of the receiving point along the zone separating the two isophase lines is not indicated by such a phase measurement, it becomes necessary to employ at least two spaced transmitters, the two transmitters cooperating to provide a grid-like pattern of intersecting circular lines, in order to obtain absolute determination of the position of the receiving point.

Systems of the character described are extremely accurate insofar as the position indications produced at the receiving point are concerned. To obtain the desired indication accuracy, however, it is necessary to maintain phase synchronization between the continuous waves radiated by each of the spaced transmitters and the associated continuous wave generating means at the receiving unit or, alternatively, to employ wave generating means at the receiving and transmitting units of such high stability that phase shift between the two compared waves is eliminated.

Since phase synchronization of the waves radiated from the transmitters with the wave generating means at the mobile receiving unit is not feasible, phase shift between compared waves is preferably obviated by the use of precision oscillators having extremely stable operating characteristics for controlling the frequency and phase of the waves radiated by each of the transmitters and of the waves generated at the receiving point.

It is preferable that the frequencies of the waves radiated by the spaced transmitters be located adjacent the broadcast band or at least below the ultra-high frequency band in order to obviate the problem of line-of-sight transmission. This, of course, necessitates the location of the channel frequencies of the transmitters in the most crowded portion of the frequency spectrum, at least insofar as operations in the United States are concerned. Since the frequency allocations in this band must be reduced to a minimum, it is desirable to maintain the operating frequencies of the spaced transmitters within a single channel allocation.

Another problem encountered in the operation of continuous wave systems is that of eliminating ambiguity from the phase measurements which provide the desired position information. Thus while the two phase measurements identify the position of the receiving station relative to two intersecting pairs of circular isophase lines, they do not indicate the particular pairs of lines to which the indications are related. This means that in operating the system the geographic location of the receiving system must be known at the start of movement of the receiving system relative to the transmitting stations and, furthermore, that the successive wave lengths must be counted as the receiving station is moved relative to the grid-like pattern of circular lines. It also means that a mobile craft entering the radiation pattern of the transmitters cannot utilize the radiated signals to determine its position without employing auxiliary equipment to determine the approximate position of the craft relative to the signal transmitters.

It is an object of the present invention, therefore, to provide an improved radio location system of the continuous wave type which is free of phase synchronization difficulties and in which the above mentioned disadvantages pertaining to ambiguity are entirely obviated.

It is another object of the present invention to provide a radio position indicating system of the above character in which the number of channel frequencies employed is minimized.

It is a further object of the present invention to provide a radio position indicating system employing a minimum number of channel frequencies while at the same time simplifying the receiving and transmitting apparatus required.

It is another object of the present invention to provide an improved radio location system of the continuous wave type which is free of phase synchronization difficulties and in which certain of the position indications obtained have sensitivities, insofar as the spacing of the isophase lines is concerned, which will be referred to hereinafter as phase sensitivity, different from the phase sensitivity normally determined by the frequencies of the radiated waves.

Still another object of the present invention is to provide a radio position finding system of the character described in which non-ambiguous position indications are obtained.

It is a still further object of the invention to provide a radio position finding system of the character described in which a plurality of low phase sensitivity position indications and high phase sensitivity indications are obtained, the low phase sensitivity indications being effective to locate the range of the high phase sensitivity indications and being characterized by widely spaced phase coincidences and the high phase sensitivity indications being characterized by closely spaced phase coincidences.

It is likewise an object of the present invention to provide a radio position determining system of the above indicated character wherein such high phase sensitivity and low phase sensitivity indications are obtained while employing carrier frequencies suitable for efficient long range propagation.

It is also an object of the present invention to provide improved receiving equipment for use in radio location systems of the above indicated character.

An additional object of the present invention is to provide improved transmitting apparatus for use in radio location determining systems of the character described above.

Figure 2:
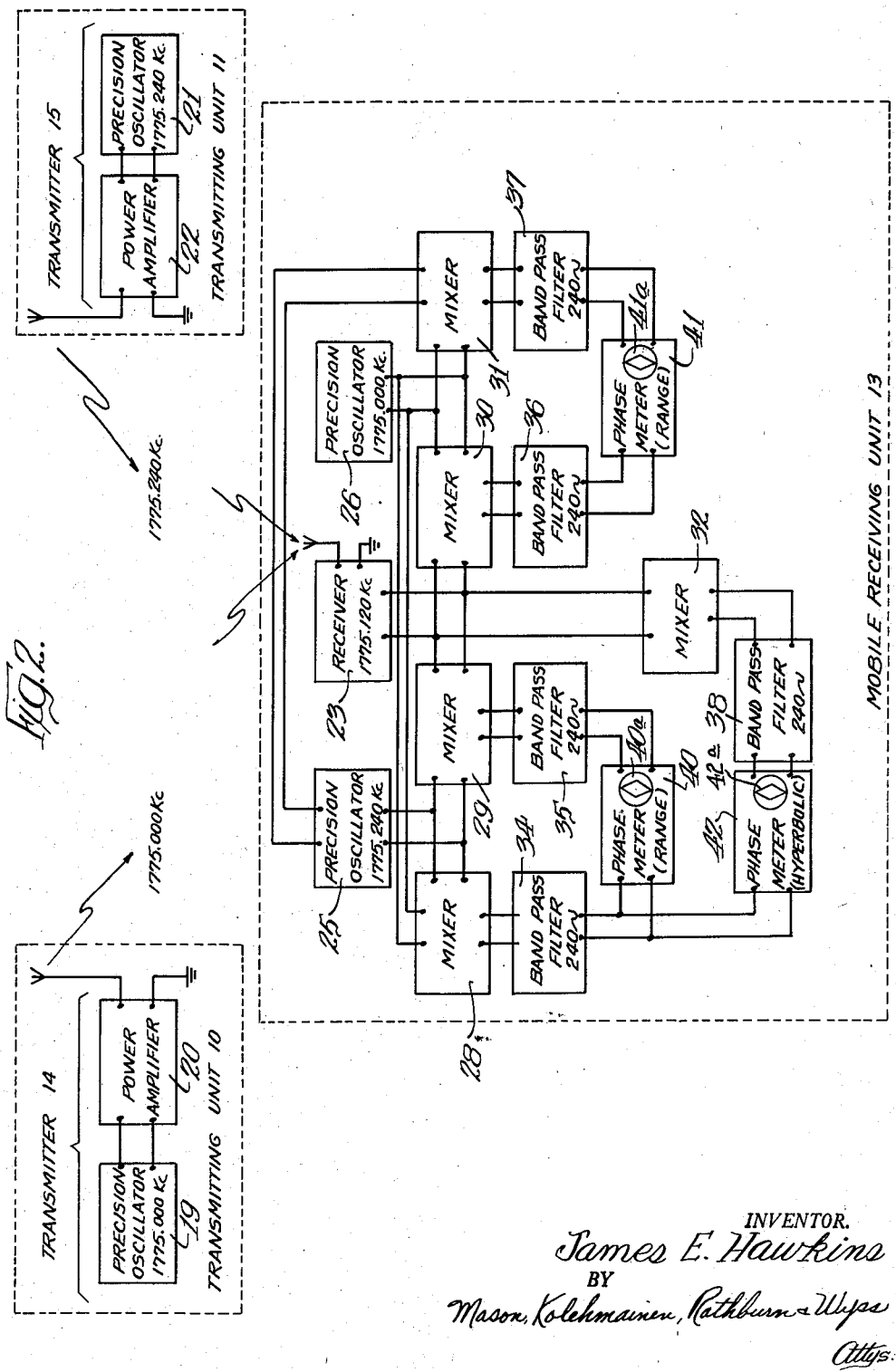
Figure 3:
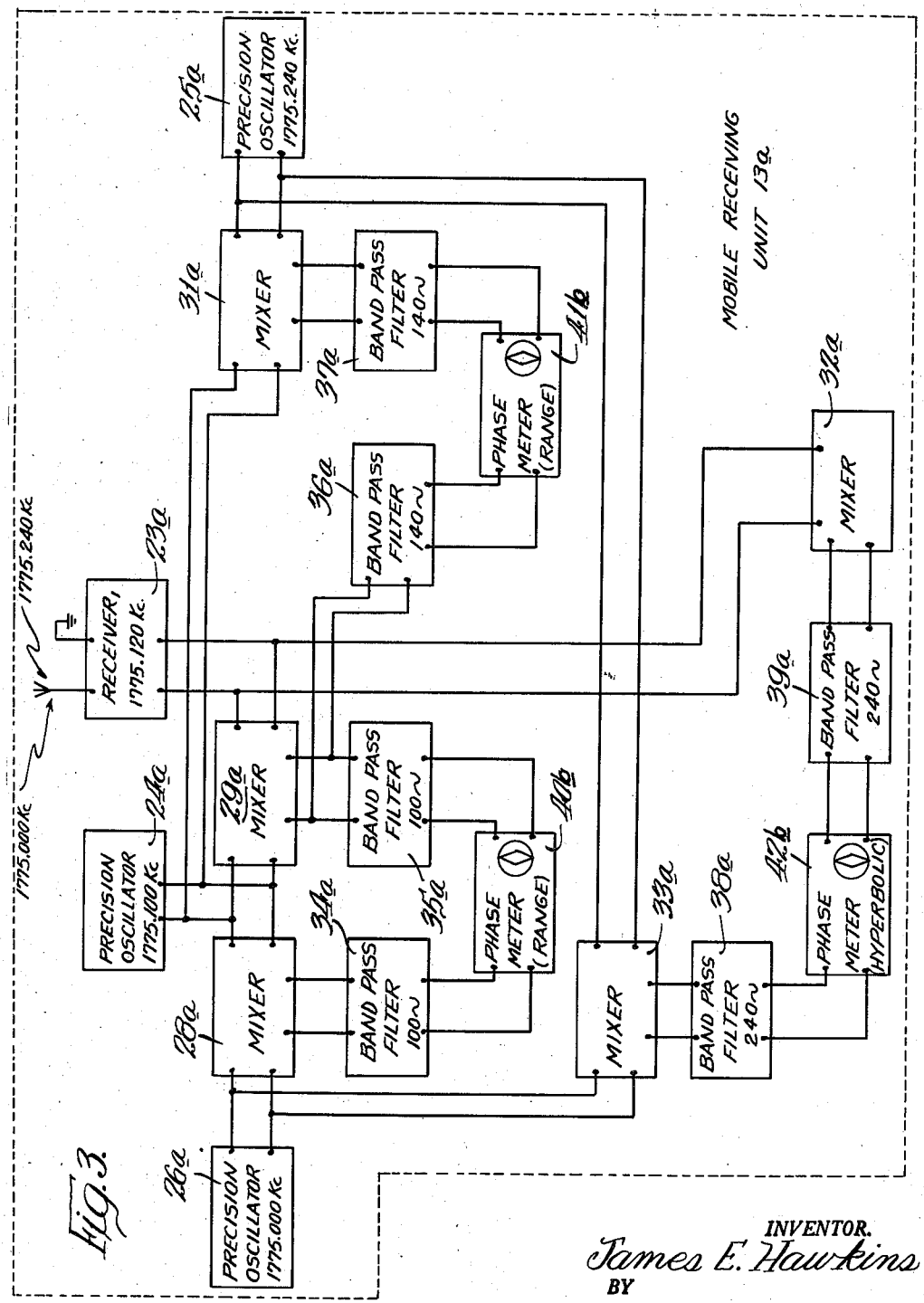

The invention both as to its organization and method of operation, together with further objects and advantages thereof, will best be understood by reference to the specification taken in connection with the accompanying drawings in which:

Fig. 1 is a pictorial representation of a water covered area over which survey operations are to be performed illustrating one positional arrangement of the transmitters embodied in the system, and a grid-like pattern of circular isophase lines together with a family of hyperbolic isophase lines effectively produced in space by the signals radiated by the transmitters;

Fig. 2 diagrammatically illustrates the transmitting and receiving equipment of a position indicating system embodying the present invention in which the transmitters provide standing waves disposed about the transmitting points in the manner shown in Fig. 1 and the receiving equipment translates the signals from the transmitters into position indications;

Fig. 3 is a diagrammatic representation of an alternative construction of the receiving unit shown in Fig. 2;

Fig. 4 constitutes a diagrammatic representation of another two transmitter position indication system embodying the present invention which is basically similar to that disclosed in Fig. 2 but in which a different choice of transmitting frequencies and a different arrangement of the receiving equipment is employed;

Fig. 5 diagrammatically illustrates a single center point position indicating system for providing a pair of position indications, one having a low phase sensitivity and the other having a high phase sensitivity;

Fig. 6 diagrammatically illustrates an alternative construction of the receiving equipment embodying the present invention and adapted for use in the system of Fig. 4;

Fig. 7 diagrammatically illustrates a two center point position indicating system for providing an unambiguous position fixed by means of two sets of indications, each set having high and low phase sensitivity indications; and Fig. 8 is a diagrammatic representation of the disposition of the standing waves effectively produced in space about the two transmitting points of a two center point transmitting system in order to provide an unambiguous position determination.

Referring now to the drawings and particularly to Fig. 1 thereof, the invention is illustrated as embodied in a two center point continuous wave transmitting system radiating signals for establishing a grid-like pattern of circular isophase lines combined with a two foci hyperbolic continuous wave system in order to provide position information at a mobile receiving unit 13 which may be carried by a vessel or vehicle 12 operating within the radius of transmission of a pair of spaced position signal transmitting units 10 and 11. As described more fully hereinafter, each of the transmitting units 10 and 11 is equipped with a transmitter respectively designated by the reference characters 14 and 15 (Fig. 2) which transmitters function continuously to radiate carrier waves of different highly stable frequencies. As previously indicated, the continuous wave radiated by the transmitter 14 when compared with a signal of identical frequency at the mobile receiving unit produces an indication which changes as a function of the position of the mobile receiving unit with respect to the location of the transmitting unit 10. Thus transmitter 14 produces standing waves in space which are characterized by isophase lines 16 circular in contour and having a common center at the point of location of the transmitting unit 10. Similarly, the continuous wave radiated by the transmitter 15 at the unit 11 when compared with a wave of identical frequency at the mobile receiving unit 13 provides an indication which is a function of the position of the mobile receiving unit with respect to the location of the transmitting unit 11. Specifically, continuous wave radiation by the transmitter 15 produces waves in space which are characterized by isophase lines 17 which are circular in contour about the point of location of the transmitting unit 11 as a center. The continuous waves radiated by the transmitters 14 and 15 also produce waves in space characterized by isophase lines represented by alternate dot and dash lines 18 which are hyperbolic in contour and have foci at the points of location of the two transmitting units. As will subsequently become evident, the phase relationship between these carrier waves when received at the mobile receiving unit 13 is indicative of the position of the mobile receiving unit with respect to one pair of these hyperbolic lines.

Referring now to Fig. 2, there is shown one type of equipment embodying the present invention which may comprise the transmitting units 10 and 11 and the mobile receiving unit 13 illustrated in Fig. 1. As shown in Fig. 2, the transmitter 14 at the unit 10 includes a precision oscillator 19 and a power amplifier 20. The precision oscillator is adapted to provide a signal of highly stable frequency which, as indicated in Fig. 2, may be in the order of 1775.000 kilocycles although it will be understood that the particular operating frequencies of the various transmitters and receivers may be of any suitable value, the assigned frequencies serving only to illustrate the principles of the invention. The power amplifier 20 is of conventional design and functions merely to increase the amplitude of the signals from the precision oscillator to a magnitude suitable for long range propagation to all portions of the survey area. The transmitter 15 at the unit 11 also comprises a precision oscillator 21 and a power amplifier 22, the former functioning to provide a signal of highly stable frequency in the order of 1775.240 kilocycles and the latter serving to amplify this signal to provide the desired power output from the transmitter 15. The precision oscillators 19 and 21 may be of the type described on pages 6 and 7 of Electronic Design for February 1953 (see also Bureau of Standards Technical News Bulletin February, 1953) utilizing a junction transistor as the source of driving power for a high stability quartz crystal unit thereby providing an oscillator having an output frequency which is constant to better than one part in $10^9$ per day.

To facilitate the translation of carrier waves radiated by the transmitters 14 and 15 into position indications, the mobile receiving unit 13 may comprise a fixed tuned receiver 23, a pair of precision oscillators 25 and 26, a plurality of mixers 28, 29, 30, 31 and 32, a plurality of band pass filters 34, 35, 36, 37 and 38, and a group of phase meters 40, 41, and 42. As indicated in Fig. 2, receiver 23 is tuned to a center frequency of 1775.120 kilocycles and is designed to receive both of the carrier waves of 1775.000 and 1775.240 kilocycles respectively radiated by the transmitters 14 and 15. The output of the receiver 23 thus includes a pair of radio frequency signals received from the transmitters 14 and 15 which are applied simultaneously to the mixers 29, 30, and 32. The precision oscillators 25 and 26 are similar in design to the oscillators 19 and 21 at the transmitting units 10 and 11, respectively. The oscillator 25 generates a signal having a highly stable frequency of 1775.240 kilocycles identical in frequency to the signal radiated by transmitter 15 whereas the oscillator 26 generates a signal having a highly stable frequency of 1775.000 kilocycles identical in frequency to the wave radiated by the transmitter 14. The band pass filters are sharply tuned audio filters of standard construction and the phase meters 40, 41, and 42 may be likewise of standard construction but are preferably of the type disclosed and claimed in Hawkins et al. Patent No. 2,551,211 issued May 1, 1951, and assigned to the same assignee as the present invention. The mixers 28, 31 and 32 may be convertor stages of conventional design and are adapted to heterodyne two radio frequencies in order to reproduce the beat frequency therebetween. The mixers 29 and 30, on the other hand, may be balanced mixers of the type normally employed in single side band exciters, one particular mixer circuit of this type being shown on pages 302, 303 of The Radio Amateur's Handbook, 1953 edition. The input circuits of the mixers 29 and 30 are supplied with input signals from the oscillators 25 and 26, respectively, which are applied out of phase to the grids of the push pull connected tubes of each of the mixers, and with the two carrier wave signals accepted by the receiver 23. The mixers 29 and 30 each heterodyne the signal from its associated oscillator with the signals from receiver 23 in order to reproduce the beat frequency or difference frequency therebetween. These mixers do not heterodyne the two signals from the receiver due to the fact that the signals from the receivers are applied in phase to the grids of the push-pull connected tubes of the mixer and are thus balanced in the common output impedance. Specifically, the mixer 29 has applied thereto both the output signals of receiver 23 and the output signal of the oscillator 25 and, therefore, this mixer functions to heterodyne the 1775.240 kilocycle signal from the oscillator 25 and the 1775.000 kilocycle signal from the receiver 23 thus producing a 240 cycle beat frequency or difference signal. This beat frequency signal is applied through the band pass filter 35 to the right hand set of input terminals of the phase meter 40 and, since the filter 35 is tuned to a frequency of 240 cycles, all frequencies except the desired 240 cycle beat frequency signal are rejected. As indicated above, the 240 cycle difference in frequency between the two signals from receiver 23 is not reproduced by mixer 29 and, therefore, does not affect the operation of the phase meter 40. The output of the precision oscillator 25 is also applied to the mixer 28 where it is heterodyned with the 1775.000 kilocycle signal from the precision oscillator 26. The mixer 28 thus produces at its output terminals a 240 cycle beat frequency signal for application through band pass filter 34 to the left hand set of input terminals of the phase meter 40. The band pass filter 34 is also tuned to a center frequency of 240 cycles and therefore rejects all signals except the desired 240 cycle beat frequency output of the mixer 28. The phase meter 40 thus has applied to its opposite sets of input terminals two signals of identical frequency with the result that this phase meter functions to measure the phase relationship therebetween. Since the beat frequency signals applied to two sets of input terminals of phase meter 40 resulted from respectively heterodyning the signal from transmitter 14 and the output of oscillator 26 with a common signal, namely the output of oscillator 25, it is apparent that the indication on this phase meter actually represents a comparison of the phase relationship between the signal radiated by the transmitter 14 and that generated by the precision oscillator 26 at the mobile receiving unit 13. The phase of the signal generated by oscillator 26 is independent of the position of the receiving unit 13 and hence may be termed a reference signal when phase compared with the position indicating signal radiated by the transmitter 14. The indication on the phase meter 40 is thus representative of the position of the mobile receiving unit between one pair of adjacent circular isophase lines effectively produced in space as a result of carrier wave radiation by the transmitter 14 at the unit 10.

Each of the phase meters may be equipped with a rotor carrying a pointer which indexes with a circular scale in order to indicate the phase relationship between the two impressed voltages. If desired, each meter may also be equipped with a revolution counter, gear driven from the rotor element of the meter, in order to count the isophase lines traversed by the mobile receiving unit 13. For example, the pointer 40a on the meter 40 cooperates with a graduated scale positioned adjacent thereto in order to indicate the phase relationship between the signals applied to the meter from the band pass filters 34 and 35 thereby providing an indication representative of the position of the mobile receiving unit 13 between two circular isophase lines 16 having a center at the transmitting unit 10, while the revolution counter associated with this meter counts the number of complete revolutions of the pointer 40a and thereby measures the number of isophase lines 16 crossed by the receiving unit as it moves within the survey area.

While the frequency of operation of the precision oscillator 19 at the unit 10 and the precision oscillator 26 at the mobile receiving unit 13 are highly stable and have negligible phase shift therebetween, it is apparent that the signals produced by these oscillators are not actually phase synchronized and, consequently, there may exist between the outputs of these two oscillators a constant phase difference. Unless this constant phase difference is eliminated or compensated for, the indication on the phase meter 40 is a function not only of the position of the mobile receiving unit with respect to the transmitting unit 10, but also includes the constant phase difference existing between the signals produced by the oscillators 19 and 26. In order to insure that the phase meter 40 provides an indication which is independent of the constant phase difference between these signals, the mobile receiving unit may initially enter the field pattern established by the transmitters 14 and 15 at a known geographic location. The pointer 40a may then be set to provide a zero indication and subsequent movement of the receiving unit within the field pattern with respect to the known geographic location will be accurately portrayed on the phase meter 40 and its associated revolution counter.

While the indication provided by the phase meter 40 is indicative of a particular circular isophase line on which the receiving unit is located, this indication is ambiguous in the sense that the position of the receiving unit along the particular isophase line is not identified. Thus it becomes necessary to identify the location of the receiving unit on a second circular isophase line intersecting the first in order to provide a complete position determination. For this purpose, the mobile receiving unit 13 is adapted to provide an indication representative of its location between adjacent circular isophase lines 17 produced in space about the transmitting unit 11. To provide the latter indication the 1775.240 kilocycle signal output of the receiver 23 is applied to the mixer 30 where it is heterodyned with the 1775.000 kilocycle signal from the oscillator 26 in order to provide a 240 cycle beat frequency or difference signal for application through the band pass filter 36 to the left hand set of input terminals of the phase meter 41. The mixer 30 is similar in design to the mixer 29 and hence does not reproduce the 240 cycle frequency difference between the two carrier waves accepted by the receiver 23 and applied to this mixer.

To provide a reference signal for phase comparison with the output signal of mixer 30, the 1775.000 kilocycle signal from the oscillator 26 is heterodyned in the mixer 31 with the 1775.240 kilocycle signal from the precision oscillator 25, thereby producing a 240 cycle beat frequency signal for application to the right hand set of input terminals of the phase meter 41 through the band pass filter 37. Thus the phase meter 41 is excited by applied signals of identical frequency with the result that this phase meter functions to measure the phase relationship therebetween. As indicated above, the phase meter 41 includes a rotor carrying a pointer 41a which indexes with a graduated circular scale in order to facilitate an indication of the phase relationship between the two applied signals. The indication on the phase meter 41 is actually a comparison of the phase relationship between the carrier wave signal radiated by the transmitter 15 and the signal output of the precision oscillator 25 inasmuch as the signal from oscillator 26 was heterodyned with both of these signals in order to provide the beat frequencies for phase comparison by this phase meter. This indication is thus representative of the position of the mobile receiving unit 13 between adjacent circular isophase lines 17 having a common center at the location of the transmitting unit 11. As previously indicated, the rotor of the phase meter 41 may be provided with a revolution counter for indicating the number of circular isophase lines 17 traversed as the mobile receiving unit 13 moves within the field pattern established by the transmitters 14 and 15. It should also be understood that when the mobile receiving unit is initially stationed at the known geographic location mentioned above, the pointer 41a of the phase meter 41 may be set to zero to compensate for any constant phase difference existing between the signals generated by the oscillators 21 and 25.

While the indications on the phase meters 40 and 41 provide an indication of the location of the mobile receiving unit between adjacent circular isophase lines effectively produced in space by the carrier wave radiations from the spaced transmitting units, it is apparent that these indications do not identify the particular isophase lines between which the mobile receiving unit is positioned and, for that reason, these phase meter indications are ambiguous. While the use of counters for registering the number of isophase lines traversed as the mobile receiving unit moves from the known geographic location provides a certain degree of ambiguity resolution, difficulties are often encountered in the operation of the revolution counting mechanism which result in the loss of the lane count, a lane being defined as the separation between adjacent pairs of isophase lines and being indicated by a complete 360° rotation of the pointers 40a or 41a on the phase meters 40 or 41, respectively. The loss of lane count may occur due to faulty operation of the equipment, loss of signal for a brief interval of time, the presence of undesired signals such as sky waves or reflected wave energy, or other conditions of this sort. To provide a position indication for assisting in resolving ambiguity as soon as normal operating conditions are restored after temporary loss of the lane count, the position of the mobile receiving unit 13 with respect to a pair of hyperbolic isophase lines produced in space between the transmitters 14 and 15 may be ascertained. To effect the latter position indication the output of the receiver 23, consisting of the 1775.000 kilocycle carrier wave radiated by the transmitter 14 and the 1775.240 kilocycle carrier wave radiated by the transmitter 15 are heterodyned by the mixer 32 to provide a 240 cycle beat frequency or difference signal for application through the band pass filter 38 to the right hand set of input terminals of the phase meter 42. In order to provide a reference signal for phase comparison with the heterodyne signal produced by the mixer 32, the output signal of the filter 34 derived from heterodyning the signals from the oscillators 25 and 26 is applied to the left hand set of input terminals of the phase meter 42. This phase meter is therefore excited at its opposite sets of input terminals by signals of identical frequency and the indication on this phase meter is a measure of the phase relationship existing between the applied signals. Since the phase of the beat frequency signal produced by mixer 28 is independent of the position of the mobile receiving unit 13 and since the signal output of mixer 32 is a function of the position of the mobile unit relative to both of the transmitters 14 and 15, the indication on the phase meter 42 is representative of the position of the mobile receiving unit between adjacent hyperbolic isophase lines 18 having foci at the location of the transmitting units 10 and 11. To provide a means for counting hyperbolic lines 18 traversed by the mobile receiving unit during its movement within the survey area, the rotor of the phase meter 42 carrying the pointer 42a may also include means for driving a suitable revolution counter. Furthermore, the pointer 42a of the meter 42 may be zeroed when the receiving unit is stationed at the known location in the manner previously described.

As indicated above, the circular isophase lines 16 produced about the location of the transmitting unit 10 as a center point are separated along a radial line drawn through the center by a distance equal to one wave length of the continuous wave radiated by the transmitter 14 and, at the particular frequency indicated, these lines are spaced apart a distance of approximately 554 feet. Similarly the circular isophase lines 17 having a common center at the location of the transmitting unit 11 are spaced apart a distance of approximately 554 feet along a radial line passing through the center point.

As previously mentioned, the phase meter 42 functions to produce a phase angle indication which is representative of the position of the receiving unit 13 between a pair of adjacent hyperbolic isophase lines 18 produced in space between the two units 10 and 11. With the described arrangement wherein carrier wave frequencies of 1775.000 and 1775.240 kilocycles are employed, the spacing between the hyperbolic isophase lines along a base line 50 connecting the units 10 and 11 is determined by the mean frequency of 1775.120 kilocycles between the two indicated carrier waves. At this particular mean frequency isophase lines representative of the same phase relationship between the standing waves produced by the two transmitters 14 and 15 are spaced apart a distance of about 277 feet corresponding to one half wave length of the mean frequency. Hence the indication provided by the phase meter 42 identifies the position of the receiving unit 13 within a zone having a minimum width of 277 feet equal to one half of the wave length of the means frequency. The readings on the phase meters 40, 41 and 42 may be transferred to a chart showing the location of the circular isophase lines 16 and 17 and the hyperbolic lines 18 in the geographical area being surveyed thereby resolving the phase meter indications into distance determinations relative to the known geographic location mentioned above and to the known locations of the transmitting units 10 and 11.

It will be apparent that the indications on the phase meters 40, 41 and 42 are indicative of a single point location of the receiving unit 13 on the chart described above. An examination of such a chart will show that within a limited area there is only one point at which one of the hyperbolas 18 and two of the circular isophase lines 16 and 17 intersect at a common point and, consequently, if one of the lane indicators temporarily misses a count, an inspection of the chart by the operator will provide an immediate indication of this fact and the situation may be remedied by adjusting the revolution counter which is in error until a single point determination is again provided.

Referring now to Fig. 3, there is illustrated an alternative arrangement of the mobile receiving unit which may be used in conjunction with a transmitting system of the type shown in Fig. 2. The mobile receiving unit shown in Fig. 3 is designated by the reference character 13a and may be employed to receive the carrier wave signals from the pair of spaced transmitting units 10 and 11 shown in Fig. 2 and to translate the received signals into position indications. The receiving unit 13a includes a receiver 23a, three precision oscillators 24a, 25a, and 26a, a plurality of mixers 28a, 29a, 31a, 32a and 33a, a plurality of band pass filters 34a to 39a, inclusive, and a group of phase meters 40b, 41b and 42b. The receiver 23a is center tuned to a frequency of 1775.120 kilocycles midway between the two carrier wave signals radiated by the transmitting units 10 and 11 and, therefore, this receiver accepts both of these carrier wave signals. The output of the receiver 23a thus consists of a pair of signals having frequencies of 1775.240 kilocycles and 1775.000 kilocycles, respectively. The carrier wave signals from the receiver 23a are applied simultaneously to one set of input terminals of each of the mixers 29a and 32a. The mixer 29a is also supplied with a signal having a frequency of 1775.100 kilocycles from the precision oscillator 24a which functions in a manner somewhat analogous to the operation of a local oscillator in a radio frequency receiver in that it beats with the received signals to reduce them in frequency to a useable value. Specifically, the mixer 29a functions to heterodyne the signals from the receiver 23a with the result that signals of 100 cycles and 140 cycles are reproduced at the output of the mixer 29a. The band pass filter 35a is tuned to a frequency of 100 cycles and, consequently, only the 100 cycle signal output of the mixer 29a is passed to the right hand set of input terminals of the phase meter 40b. To provide a reference signal for phase comparison with the position indicating signal from the band pass filter 35a, the signal from the oscillator 24a is heterodyned by the mixer 28a with the 1775.000 kilocycle signal from the precision oscillator 26a. The mixer 28a reproduces the 100 cycles difference frequency between these two precision oscillator signals and passes the same through the band pass filter 34a to the left hand set of input terminals of the phase meter 40b. The phase of the signal output of the mixer 28a is independent of the position of the mobile receiving unit 13a within the field pattern of the transmitting units whereas the signal output of the band pass filter 35a is a function of the position of the mobile receiving unit with respect to the location of the transmitting unit 10. Thus the phase meter 40b provides an indication of the position of the mobile receiving unit 13a between a pair of circular isophase lines having a center at the location of the transmitting unit 10.

To provide a second position indication indicative of the location of the mobile receiving unit 13a with respect to the transmitting unit 11, the 140 cycle signal output of the mixer 29a derived from heterodyning the output of the oscillator 24a with the 1775.240 kilocycle signal accepted by receiver 23a from transmitting unit 11 is applied through the band pass filter 36a to the left hand set of input terminals of the phase meter 41b. The band pass filter 36a is tuned to a frequency of 140 cycles and hence rejects all of the signals reproduced by the mixer 29a except the desired 140 cycle difference frequency signal. To provide a reference signal for phase comparison with the position indicating signal applied to the phase meter 41b from the band pass filter 36a, the signal output of the oscillator 24a is heterodyned by the mixer 31a with a 1775.240 kilocycle signal from the precision oscillator 25a. The 140 cycle difference frequency between these two heterodyned signals is applied through the band pass filter 37a to the right hand set of input terminals of the phase meter 41b. The indication on the phase meter 41b is a measurement of the phase relationship between the two applied signals and is representative of the position of the mobile receiving unit 13a between a pair of circular isophase lines having a center at the location of the transmitting unit 11.

As indicated above, the phase meters 40b and 41b may be provided with revolution counters for indicating the number of circular isophase lines traversed by the mobile receiving unit in its movement relative to the spaced transmitting units 10 and 11. These phase meters may also include means for zeroing their indicating pointers when the mobile receiving unit 13a is initially located at the known geographic position with the survey area in the manner previously described.

To provide a third position indicating signal indicative of the location of the mobile receiving unit between adjacent hyperbolic isophase lines effectively produced in space as a result of carrier wave radiation from the spaced transmitting units 10 and 11, the two output signals of the receiver 23a are heterodyned by the mixer 32a. The 240 cycle difference frequency signal between these two carrier waves is applied through the band pass filter 39a, center tuned to a frequency of 240 cycles to the right hand set of input terminals of the phase meter 42b. The output signals of the two precision oscillators 25a and 26a are heterodyned by the mixer 33a in order to provide a 240 cycle reference signal for application through the band pass filter 38a to the left hand set of input terminals of the phase meter 42b. The phase of the 240 cycle reference signal from the band pass filter 38a is independent of the position of the mobile receiving unit with respect to the transmitting units, whereas the phase of the signals passed by the filter 39a is a function of the location of the mobile receiving unit with respect to both of the transmitting units 10 and 11. The phase meter 42b measures the phase relationship between the two signals applied thereto and thus indicates the position of the mobile receiving unit between a pair of adjacent hyperbolic isophase lines effectively produced in space as a result of carrier wave radiation from the spaced transmitting units 10 and 11. As previously indicated, the combination of the two range indications provided by the phase meters 40b and 41b and the hyperbolic position indication provided by the phase meter 42a effectively locates the position of the mobile receiving unit 13a and facilitates the resolution of ambiguity.

Referring now to Fig. 4, there is shown a transmitting and receiving system which is basically the same as that shown in Fig. 2 but which differs therefrom in the choice of the operating frequency of one of the transmitters in order to facilitate the use of a simplified mobile receiving unit. The system shown in Fig. 4 includes a pair of spaced transmitting units 10' and 11' for continuously radiating position indicating signals in the form of carrier waves of different frequency in order to produce position information at a mobile receiving unit 13' located within the field pattern of these transmitting units. The transmitting unit 10' comprises a transmitter 14' consisting of precision oscillator 19' for producing a highly stable frequency signal of 1775.000 kilocycles and a power amplifier 20' for increasing the amplitude of the signal output of the oscillator 19'. The transmitting unit 11' comprises a transmitter 15' which includes a precision oscillator 21' for producing a signal of 1776.000 kilocycles and a power amplifier 22' for increasing the magnitude of the signal output of the oscillator. As indicated above, the continuous waves radiated by the transmitters 14' and 15' effectively produce in space a grid-like pattern of intersecting circular isophase lines, each set of circular isophase lines having a center point at the location of one of the transmitting units.

For the purpose of providing position indications representative of the location of the mobile receiving unit 13' with respect to the grid-like pattern of circular isophase lines thus established, the receiving unit 13' includes a receiver 23', a pair of precision oscillators 43 and 44, a pair of band pass filters 45 and 46, and a pair of phase meters 40' and 41'. The receiver 23' is fixed tuned to a center frequency of 1775.500 kilocycles and thus receives both of the waves radiated by the transmitters 14' and 15' with the result that the output of the receiver 23' includes a pair of signals, one having a frequency of 1775.000 kilocycles and the other having a frequency of 1776.000 kilocycles. The band pass filters 45 and 46 function to separate these output signals since each of the band pass filters is selectively responsive to only one of them. Specifically, the filter 45 is a 1000 cycle band pass filter which passes all frequencies between 1775.000 kilocycles and 1776.500 kilocycles and rejects all frequencies falling outside of this pass band. Thus the filter 45 passes the 1776.000 kilocycle signal reproduced by the receiver 23' as a result of the wave received from the transmitter 15' to the left hand set of input terminals of the phase meter 41' but this filter rejects the 1775.000 kilocycle signal reproduced from the wave received from the transmitter 14'. To provide a high frequency reference signal for phase comparison with the signal passed by the filter 45, the precision oscillator 43 is designed to generate a signal having a highly stable frequency of 1776.000 kilocycles which signal is applied to the right hand set of input terminals of the phase meter 41'. Thus, this phase meter is energized by two signals of identical frequency and the resulting indication is a measure of the phase relationship existing therebetween. Since the frequencies of the precision oscillator 43 and the frequency of the wave received from the transmitter 15' are both highly stable, it is apparent that any change in the phase indication of the phase meter 41' is a result of the change in position of the mobile receiving unit 13' with respect to the location of the transmitting unit 11'. It is also apparent that the indication provided by the phase meter 41' is accurately representative of the position of the mobile receiving unit 13' between adjacent circular isophase lines having a center at the location of the transmitting unit 11'. The phase meter 41' may be zeroed as described above in order to eliminate the effects of any constant phase difference which may exist between the output signals of oscillators 21' and 43. In order to provide an additional indication of the position of the mobile receiving unit with respect to the circular isophase lines produced in space about the location of the transmitting unit 10', the 1775.000 kilocycle wave received from transmitter 14' and reproduced by the receiver 23' is passed through the band pass filter 46 to the right hand set of input terminals of the phase meter 40'. The band mass filter 46 is similar in design to the band pass filter 45 except that the filter 46 is designed to pass all frequencies between 1774.500 kilocycles and 1775.500 kilocycles and to reject all frequencies outside of this pass band. Thus the filter 46 passes the signal reproduced from the wave radiated by the transmitter 14' and rejects the signal reproduced from the wave radiated by the transmitter 15'. To provide a reference signal for phase comparison with the wave received from the transmitter 14', the precision oscillator 44 is designed to generate a signal having a frequency of 1775.000 kilocycles which signal is applied to the left hand set of input terminals of the phase meter 40'. The phase meter 40' therefore provides an indication which is a measure of the phase relationship between applied signals and is indicative of the location of the mobile receiving unit 13' between adjacent circular isophase lines having a center at the location of the transmitting unit 10'. Thus two indications are provided by the phase meters 40' and 41' which accurately establish the position of the mobile receiving unit 13' within the grid-like pattern formed in space by the continuous wave radiations from the transmitters 14' and 15'. If desired, the location of the mobile receiving unit 13' with respect to a pair of adjacent hyperbolic isophase lines having foci at the transmitting units 10' and 11' may be provided by heterodyning the two signals reproduced by the receiver 23' and comparing the phase of the beat frequency signal thus obtained with another beat frequency signal derived from heterodyning the signals generated by the precision oscillators 43 and 44 as described in conjunction with the transmitting and receiving system shown in Fig. 2.

While in some installations the ambiguity resolution provided by the indications on the revolution counters of the phase meters provided in the systems of Figs. 2 and 3 in cooperation with the hyperbolic indication may be entirely adequate, it is apparent that a relatively large number of locations of the mobile receiving unit within the survey area provide identical phase meter indications. Due to the large number of such identical indications on the phase meters corresponding to different geographic locations, the ambiguity resolution thus provided may fall short of that which is desired in certain installations.

To provide a system completely obviating ambiguity resolution problems, the system shown in Figs. 1, 2, 3 and 4 may be modified by installing an additional transmitter at each of the transmitting units and by obtaining a coarse position indication at the mobile receiving unit which is representative of the position of the receiving unit between circular isophase lines spaced relatively far apart in comparison to the closely spaced isophase lines produced in the systems shown in Figs. 1, 2, 3 and 4. Referring now to Fig. 5, which discloses a system modified in the manner indicated above, it will be seen that the transmitting unit 10 of Fig. 2 has been altered by adding a transmitter which is adapted to radiate a continuous wave signal at a frequency somewhat higher than the frequency of the carrier wave radiated by the transmitter 14. In order to illustrate the similarity between the system shown in Fig. 5 and that shown in Fig. 2, the component elements of these two systems which are alike have been assigned similar reference characters except that the elements shown in Fig. 5 are numbered in the 100 series and to emphasize the differences between the two systems component elements which are different have been assigned reference characters suffixed by the letter "a" in Fig. 5. Thus, for example, the transmitting unit 10 of the system shown in Fig. 2 becomes the transmitting unit 110 in Fig. 5 and the transmitter 14 becomes transmitter 114. The additional transmitter at the unit 110 is designated generally by the reference character 114a and comprises a precision oscillator 119a and a power amplifier 120a, the frequency of the signal generated by the precision oscillator as indicated in Fig. 5 being 1885.000 kilocycles. It will be understood, of course, that a second transmitting unit is actually necessary to provide a complete determination of the position of the mobile receiving unit 113, but in order to simplify the description, only one half of the required receiving and transmitting equipment has been illustrated. The mobile receiving unit 113 thus includes a pair of fixed tuned receivers 123 and 123a, a pair of precision oscillators 124 and 124a, a pair of phase meters 140 and 140a for providing phase indications of relatively high sensitivity, a phase meter 142a for providing phase indications of relatively low sensitivity, and a mechanical differential 145a joining the rotor elements of the phase meters 140 and 140a and having its output connected to drive the phase meter 142a. The mobile receiving unit 113 thus provides a pair of fine position indications accurately representative of the position of the mobile receiving unit between two pairs of circular isophase lines both having a common center at the point of location of the transmitting unit 110 and being respectively established in space by radiations from the transmitters 114 and 114a.

To provide these fine position indications, the receiver 123 is fixed tuned to a center frequency of 1775.000 kilocycles and is sufficiently selective to receive the wave radiated by the transmitter 114 and to reject the wave radiated by the transmitter 114a since these two carrier waves are separated in the frequency spectrum by approximately 110 kilocycles. The receiver 123 reproduces the continuous wave from transmitter 114 having a frequency of 1775.000 kilocycles and applies this wave to the left hand set of input terminals of the phase meter 140. In order to provide a reference signal for phase comparison with the signal output of the receiver 123, the precision oscillator 124 generates a highly stable signal having a frequency of 1775.000 kilocycles which is applied to the right hand set of input terminals of the phase meter 140. Since the phase of the reference signal from oscillator 124 is independent of the position of the mobile receiving unit and the phase of the position indicating signal supplied from receiver 123 is a function of that position, the indication on the phase meter 140 is accurately representative of the position of the mobile receiving unit between adjacent circular isophase lines produced in space about the transmitting unit 110 as a result of carrier wave radiation by the transmitter 114.

The receiver 123a is fixed tuned to a center frequency of 1885.000 kilocycles and is sufficiently selective to receive the wave radiated by the transmitter 114a and to reject the wave radiated by the transmitter 114. The receiver 123a therefore reproduces the 1885.000 kilocycle position indicating signal from transmitter 114a and applies the same to the right hand set of input terminals of the phase meter 140a. The precision oscillator 124a generates a reference signal having a frequency of 1885.000 kilocycles for application to the left hand set of input terminals of the phase meter 140a thereby providing a signal having a phase which is independent of the position of the mobile receiving unit for phase comparison with the output of the receiver 123a. The indication on the phase meter 140a is therefore indicative of the position of the mobile receiving unit 113 between adjacent circular isophase lines effectively produced in space about the location of the transmitting unit 110 due to continuous wave radiation by transmitter 114a.

As previously indicated, the spacing of each set of the circular isophase lines produced about the transmitting unit 110 as a center point is determined by the frequency of the waves respectively radiated by the transmitters 114 and 114a, the spacing between isophase lines of each set being equal to one wave length of the frequency of the radiated wave producing it. Thus it may be said that the phase sensitivity of the position indicating signals from these transmitters, i. e., the rate at which the phase of the received signals change upon movement of the mobile receiving unit, is determined by the frequencies of the pair of radiated continuous wave signals. The indications on the phase meters 140 and 140a may be termed fine position indications since these indications are representative of the position of the mobile receiving unit between relatively closely spaced circular isophase lines.

If, as shown in Fig. 5, the rotors of phase meters 140 and 140a are mechanically connected to drive a differential mechanism 145a, it is apparent that the output shaft 146a of the differential mechanism will be driven at a rate which is a function of the rate of change of the indications on the phase meters. As previously indicated, the rate of change of the phase meter indications is in turn a function of the frequencies of the waves radiated by transmitters 114 and 114a and, therefore, the output shaft 146a is driven at a rate corresponding to the difference in frequency between the waves respectively radiated by these two transmitters. The output shaft 146a may be mechanically coupled to the rotor of the phase meter 142a in order to provide an indication representative of the position of the mobile receiving unit with respect to the location of the transmitting unit 110. Although the indication of the pointer 147a of the phase meter 142a changes in response to changing position of the receiving unit 113, it will be apparent that this change occurs at a much slower rate than the change in indication of the pointers of the phase meters 140 or 140a. For example, if the receiving unit 113 is moved along a line passing through the location of the transmitting unit 110, a complete revolution of the pointer of the phase meter 140 occurs when the receiving unit 113 is moved a distance of 554 feet since the circular isophase lines effectively produced in spaced by the wave radiated by the transmitter 114 are spaced apart a distance corresponding to one wave length of the wave frequency. To induce a complete revolution of the pointer of phase meter 140a a movement of only 522 feet along the radial line passing through the location of the transmitting unit 110 is necessary since the circular isophase lines effectively produced in space by wave radiation from transmitter 114a are spaced apart a distance corresponding to one wave length of the indicated frequency. Since the pointer 147a is rotated at a rate which is a function of the difference frequency of 110 kilocycles between the two radiated wave frequencies, one complete revolution of this pointer will require movement of the receiving unit along a radial line for a distance of approximately 8950 feet. In effect, the indication provided by the phase meter 142a represents the location of the receiving unit 113 between a pair of widely spaced circular isophase lines, the particular spacing corresponding to one wave length of the difference frequency of 110 kilocycles between the frequencies of the waves radiated by the transmitted 114 and 114a. Thus, the indication on phase meter 142a may be termed a low phase sensitivity, or coarse, position indication, the function of which is to locate the position of the mobile receiving unit within a zone having a width of 8950 feet. The indication on phase meter 142a is sufficiently accurate to determine the approximate location of the receiving unit within this zone and the indications on phase meters 140 and 140a may be employed to define the exact location of the receiving unit within the identified zone. As previously indicated, a second set of fine and coarse position indications may be provided representative of the location of the mobile receiving unit 113 with respect to another transmitting unit spaced from the unit 110 in order to provide a complete position determination.

An alternative construction of the mobile receiving unit for providing position indications of both high and low phase sensitivity is shown in Fig. 6 wherein this unit is designated by the reference character 113'. The receiving unit 113' shown in Fig. 6 is adapted for operation in conjunction with a transmitting system of the type disclosed in Fig. 5 and, like the mobile receiving unit 113 previously described, is shown as comprising the equipment required to provide fine and coarse position indications with respect to only a single transmitting unit, although it will be understood that actually two spaced transmitting units are employed and additional equipment is included at the receiving unit to provide position indications relative to the second transmitting unit. Since the receiving unit 113' as shown provides position indications representative of its location with respect to the transmitting unit 110, this receiving unit includes a pair of fixed tuned radio frequency receivers each responsive to one of the two waves radiated by the transmitting unit 110. Specifically, the receiving unit 113' comprises a receiver 123' fixed tuned to the 1775.000 kilocycle frequency of the wave radiated by the transmitter 114, a receiver 123a' tuned to the 1885.000 kilocycle frequency of the wave radiated by the transmitter 114a, a pair of precision oscillators 124' and 124a', a pair of phase meters 140' and 142a' and a pair of mixers 148 and 149. The selectivity of receiver 123' is obviously such that the wave radiated by the transmitter 114 is received whereas the wave radiated by transmitter 114a is rejected. The 1775.000 kilocycle signal reproduced by receiver 123' is applied to one set of input terminals of paste meter 140', the other set of input terminals of which are excited by the 1775.000 kilocycle reference signal generated by precision oscillator 124'. The phase meter 140' indicates the phase relationship between these two applied signals and thereby provides an indication representative of the position of the mobile receiving unit 113' between adjacent closely spaced circular isophase lines, i. e., spaced apart one wave length of the frequency of the wave radiated by transmitter 114, having a center at the location of transmitting unit 110. The phase meter 140' may be zeroed as previously described by initially stationing the mobile receiving unit 113' at a known geographic location and adjusting the pointer of the meter until the desired phase indication appears on the meter. Thus the constant phase difference which may exist between the signals generated by precision oscillators 119 and 124' does not appear in the indication provided by the phase meter 140' and due to the high stability of the phase compared signals any change in phase meter indication is, for practical purposes, solely a result of change in position of the receiving unit with respect to the source of the radiated waves.

From the foregoing explanation, it will be understood that the receiving unit shown in Fig. 6 actually comprises one half of the complete receiving equipment required to provide a second fine indication in order to define the location of the receiving unit along the circular isophase line identified by the indication on the phase meter 140'. As mentioned above, the transmitting and receiving equipment for providing this second indication has been omitted from the drawing in order to simplify the explanation, although it will be recognized that a transmitting unit having a pair of transmitters operating at frequencies somewhat different from the operating frequencies of the transmitters 114 and 114a may be employed and additional receiving equipment identical to that shown in Fig. 6 except for the corresponding changes in frequency of operation will be installed at the receiving unit 113'.

To provide a coarse phase indication for the purpose of resolving ambiguity of the fine position indication appearing on phase meter 140', the difference frequency between the two carrier waves radiated by the transmitters 114 and 114a may be phase compared with the difference frequency between the carrier waves generated by the precision oscillators 124' and 124a'. This phase comparison may be effected by heterodyning the output signals of the oscillators in the mixer 149 and applying the 110 kilocycle reference signal thus produced to the meter 142a' for phase comparison with a 110 kilocycle signal derived by heterodyning the signal outputs of receivers 123' and 123a' in the mixer 148. Since the phase of the 110 kilocycle produced by the mixer 149 is independent of the position of the receiving unit and since the phase of the signal produced by mixer 148 changes upon movement of the receiving unit at a rate which is a function of the difference in frequency between the waves radiated by transmitters 114 and 114a, it is apparent that the indication on the phase meter 142a' changes at a rate which is also a function of the difference frequency between the radiated carrier waves. In other words, the phase sensitivity of the position indicating signal supplied to phase meter 142a' from mixer 148 corresponds to a signal of 110 kilocycles, which may be termed a phantom frequency equal to 110 kilocycles.

Thus, when the 110 kilocycle signal from mixer 148 is phase compared with the 110 kilocycle reference signal from mixer 149, one complete revolution of the pointer of phase meter 142a' corresponds to approximately seventeen complete revolutions of the pointer of phase meter 140'. In effect the indication on phase meter 142a' is representative of the position of the mobile receiving unit 113' between adjacent circular isophase lines having a center at the location of transmitting unit 110 and spaced apart on a radial line through this unit by a distance corresponding to one wave length of the 110 kilocycle difference frequency between radiated waves. It will thus be observed that, by virtue of the heterodyning action heretofore described, a position indication signal is obtained having a low phase sensitivity while still employing carrier frequencies which may be employed to produce a phase sensitivity approximately seventeen times less.

By adding receiving equipment for providing similar indications representative of the position of the mobile receiving unit 113' with respect to a second transmitting unit spaced from the transmitting unit 110, a pair of fine position indications and a pair of coarse position indications may be provided, the coarse indications being effective to locate the receiving unit within a relatively wide zone and the fine indications being effective to define the exact position of the receiving unit within the identified zone.

A complete radio location system embodying the present invention and characterized by the use of a minimum number of channel frequencies as well as simplified receiving equipment is shown in Fig. 7 wherein a pair of spaced transmitting units 210 and 211 are each equipped with a pair of transmitters of the type disclosed in Fig. 5 in order to radiate position indicating signals to a mobile receiving unit 213 located within the survey area. In particular, the transmitting unit 210 comprises a transmitter 214 and a transmitter 214a each of which consists of a precision oscillator and a power amplifier. The precision oscillator included in the transmitter 214 is designated by the reference character 219 and is adapted to generate a highly stable signal having a frequency of 1775.000 kilocycles which signal is amplified by the power amplifier 220 to the desired magnitude for radiation to the mobile receiving unit 213. The precision oscillator of the transmitter 214a is designated by the reference character 219a and is designed to generate a signal having a stable frequency of 1885.000 kilocycles which is amplified by the power amplifier 220a also for radiation to the mobile receiving unit 213. The transmitting unit 211 includes a pair of transmitters 215 and 215a each of which also comprises a precision oscillator and a power amplifier, the precision oscillator and power amplifier of the transmitter 215 being designated by the reference characters 221 and 222 and the precision oscillator and power amplifier of the transmitter 215a being designated by the reference characters 221a and 222a. As indicated in Fig. 7, the precision oscillator 221 is designed to generate a signal having a highly stable frequency of 1776.000 kilocycles whereas the precision oscillator 221a is designed to generate a signal having a highly stable frequency of 1886.000 kilocycles both of which are amplified by their associated power amplifiers in order to provide signals suitable for long range propagation to all portions of the survey area.

The waves radiated by the pair of transmitters at each of the transmitting units 210 and 211 are received at the mobile receiving unit 213 for the purpose of producing the desired position indications. The receiving unit 213 includes a pair of receivers 223 and 223a each of which is responsive to the waves radiated by only one of the transmitters at each of the transmitting units 210 and 211. Specifically, the receiver 223 is fixed tuned to a center frequency of 1775.500 kilocycles and is sufficiently selective to receive the waves radiated by the transmitters 214 and 215 and to reject the waves radiated by the transmitters 214a and 215a. The receiver 223a, on the other hand, is fixed tuned to a center frequency of 1885.500 kilocycles and is sufficiently selective to receive the waves radiated by the transmitters 214a and 215a and to reject the waves radiated by the transmitters 214 and 215. Thus the output of the receiver 223 comprises a pair of signals having frequencies of 1775.000 and 1776.000 kilocycles, respectively, which signals are separated by band pass filters 224 and 225 connected across the output terminals of the receiver. The band pass filter 224 has a 1000 cycle pass band and is designed to pass all signals having a frequency between 1775.500 and 1776.500 kilocycles and to reject all frequencies beyond the pass band. Thus the band pass filter 224 passes the 1776.000 kilocycle signal produced from the wave received from the transmitter 215 to the left hand set of input terminals of phase meter 226 and prevents the application of the 1775.000 kilocycle signal produced from the wave received from transmitter 214 to this phase meter. The right hand set of input terminals of the phase meter 226 is excited by the output signals of a precision oscillator 227 designed to generate a radio frequency reference signal having a highly stable 1776.000 kilocycle frequency. The phase meter 226 provides an indication of the phase relationship between the two applied signals which is representative of the position of the mobile receiving unit 213 between adjacent circular isophase lines effectively produced in space by carrier wave radiation by the transmitter 215. These isophase lines are spaced apart a distance of 554 feet corresponding to one wave length of the 1776.000 kilocycle signal radiated by the transmitter 215 and, consequently, the indication on the phase meter 226 may be termed a fine position indication.

The second output signal of the receiver 223, corresponding to the wave received from the transmitter 214, is passed by the band pass filter 225. This filter passes all signals having frequencies between 1774.500 and 1775.500 kilocycles and therefore prevents the passage of the 1776.000 kilocycle signal appearing at the output terminals of receiver 223. The 1775.000 kilocycle position indicating signal passed by the filter 225 is applied to the left hand set of input terminals of phase meter 228 for phase comparison with a 1775.000 kilocycle reference signal generated by precision oscillator 229. The phase meter 228 measures the phase relationship between the two applied signals and provides an indication which is indicative of the position of the mobile receiving unit 213 between adjacent circular isophase lines having a center at the location of the transmitting unit 210 and spaced relatively close together at a separation corresponding to one wave length of the frequency of the signal radiated by the transmitter 214. Therefore, the phase meters 226 and 228 each provides a fine position indication representative of the location of the mobile receiving unit with respect to the locations of the transmitting units 211 and 210, respectively. The indicating elements of the phase meters 226 and 228 may be zeroed in the manner previously described when the mobile receiving unit is stationed at a known geographical location thereby insuring that changes in phase meter indication are indicative solely of a change in the position of the mobile receiving unit relative to the transmitting units.

The two signals received by receiver 223a from the transmitters 214a and 215a are separated by band pass filters 224a and 225a each of which is selective to only one of the signals appearing at the output of receiver 223a. Specifically, the band pass filter 224a passes all signals having a frequency between 1885.500 and 1886.500 kilocycles and rejects all other signals whereas the band pass filter 225a passes all signals having a frequency between the 1884.500 and 1885.50 kilocycles and rejects all other signals. Thus the 1886.000 kilocycle signal received from the transmitter 215a and reproduced by the receiver 223a is passed through the band pass filter 224a but the signal produced from the wave radiated by the transmitter 214a is rejected by this filter. The 1886.000 kilocycle position indicating signal passed by the band pass filter 224a is applied to mixer 232 which functions to heterodyne this signal with the 1776.000 kilocycle output of the receiver 223 passed by filter 224 thereby reproducing a 110 kilocycle position indicating signal for application to the left hand set of input terminals of phase meter 231. To provide a reference signal for phase comparison with this position indicating signal, the 1886.000 kilocycle signal output of precision oscillator 227a is applied to the mixer 230 where it is heterodyned with the 1776.000 kilocycle output of the oscillator 227. The mixer 230 heterodynes the two signals applied thereto and produces a 110 kilocycle difference frequency signal which has a phase independent of the position of the mobile receiving unit 213 and which is applied to the right hand set of input terminals of the phase meter 231. The phase meter 231, therefore, provides a phase indication which is representative of the position of the mobile receiving unit 213 between widely spaced circular isophase lines having a center at the location of the transmitting unit 211 and separated by a distance corresponding to the difference frequency between the carrier waves radiated by the transmitters 215 and 215a.

The 1885.000 kilocycle output of the band pass filter 225a is applied to the mixer 235 which functions to heterodyne this signal with the 1775.000 kilocycle output of receiver 223 passed by filter 225 thereby reproducing a 110 kilocycle position indicating signal for application to the left hand set of input terminals of the phase meter 234. To provide a reference signal for phase comparison with this position indicating signal, the 1885.000 kilocycle signal generated by precision oscillator 229a is applied to the mixer 233 where it is heterodyned with the 1775.000 kilocycle signal generated by precision oscillator 229. The mixer 233 reproduces a 110 kilocycle reference signal having a constant phase independent of the position of the receiving unit for application to the right hand set of input terminals of the phase meter 234 with the result that this phase meter provides a measurement of the phase relationship existing between the two applied signals. As previously indicated, the phase angle measurement on the phase meter 234 is representative of the position of the mobile receiving unit 213 relative to widely spaced circular isophase lines having a center at the location of the transmitting unit 210 and separated by a distance equal to one wave length of the 110 kilocycle difference frequency between the waves radiated by the transmitters 214 and 214a. Thus the indications on the phase meters 231 and 234 which may be termed coarse position indications establish the position of the mobile receiving unit within a zone of relatively large area and the indications on the phase meters 226 and 228 accurately define the position of the receiving unit within this zone.

The disposition of the standing waves effectively produced in space about the location of the transmitting units is shown in Fig. 8 in which the closely spaced circular isophase lines having a center at the transmitting unit 210 are indicated by the reference character 250 and are shown in solid lines whereas the closely spaced circular isophase lines having a center at the location of the transmitting unit 211 are represented by the dotted lines 251. As previously mentioned, the circular isophase lines 250 are separated along any radial line drawn through the location of the transmitting unit 210 by a distance corresponding to one wave length of the frequency of the fine position indicating signals radiated by the transmitter at the unit 210. Similarly, the circular isophase lines 251 are separated along a radial line by a distance corresponding to one full wave length of the position indicating signals radiated by the transmitter at the unit 211. The widely spaced circular isophase lines having centers respectively located at the transmitting units 210 and 211 are represented by the alternate dot and dash lines 253 and 254, the isophase lines 253 having a center at the location of the transmitting unit 210 and the isophase lines 254 having a center at the location of the transmitting unit 211. The widely spaced circular lines 253 are separated by a distance corresponding to one wave length of the difference frequency between the transmitters 214 and 214a at the unit 210 and the spacing between the circular lines 254 corresponds to one full wave length of the difference frequency between the transmitters 215 and 215a at the unit 211. Since, as previously indicated, there are approximately 17 closely spaced isophase lines between each pair of the widely spaces isophase lines it is apparent that a number of closely spaced isophase lines have been eliminated from Fig. 8 in order to increase the clarity of the drawing.

From the foregoing explanation, it now becomes apparent that the present invention provides a radio location system employing a minimum number of channel frequencies as well as a reduction in the amount and complexity of the equipment necessary to provide a complete position determination. It is also obvious that the invention affords a complete solution to the problems of ambiguity resolution by providing both coarse and fine position indications. It is further apparent that, while the description has been directed to the use of a single receiving unit, any number of receiving units may be employed simultaneously to provide the desired position indications at each of the units relative to a single set of transmitting units.

While particular embodiments of the invention have been shown, it will be understood, of course, that the invention is not limited thereto since many modifications may be made and it is, therefore, contemplated by the appended claims to cover any such modifications as fall within the true spirit and scope of the invention.

What is claimed as new and desired to be secured by Letters Patent is:

1. Wave signal receiving apparatus for translating at least two space radiated signals into position indications comprising means for receiving said space radiated signals, a first signal generating means for producing a first signal having a frequency related to that of the first of the received signals, a second signal generating means for producing a second signal having a frequency related to that of the second of the received signals, means for comparing the phase of the first received signal with the first generated signal to produce a first position indication representative of the location of said receiving apparatus relative to the source of said first received signal, means for comparing the phase of the second received signal with the second generated signal to produce a second position indication, and means for comparing the phase of the two received signals to provide a third position indication.

2. Wave signal receiving apparatus for translating at least two space radiated signals received from spaced source of said signals into position indications comprising means for receiving said space radiated signals, means for separating said received signals, a first signal generating means for producing a first generated signal having a frequency related to that of the first of the received signals, a second signal generating means for producing a second generated signal having a frequency related to that of the second of the received signals, means for comparing the phase of the first received signal with the first generated signal to produce a first position indication representative of the location of said receiving apparatus relative to the source of said first received signal, and means for comparing the phase of the second received signal with the second generated signal to produce a second position indication representative of the location of said receiving apparatus relative to the source of said second received signal, and means for resolving the ambiguity of the first and second position indications provided by said phase comparing means.

3. Wave signal receiving apparatus for translating at least two space radiated signals received from spaced sources of said signals into position indications comprising means for receiving said space radiated signals, a pair of filters each selectively responsive to one of the received signals for separating said received signals, a first generating means for producing a first generated signal having a frequency related to that of the first of the received signals, a second generating means for producing a second generated signal having a frequency related to that of the second of the received signals, means for comparing the phase of the first received signal with the first generated signal to produce a first position indication representative of the location of said receiving apparatus relative to the source of said first received signal, and means for comparing the phase of the second received signal with the second generated signal to produce a second position indication representative of the location of said receiving apparatus relative to the source of said second received signal, and means for resolving the ambiguity of the first and second position indications provided by said phase comparing means.

4. Wave signal receiving apparatus for translating at least two received signals into position indications comprising, means for receiving said signals, means for generating a first generated signal related in frequency to a first of said received signals, heterodyning means for producing a first beat frequency related to the difference frequency between said first generated signal and said first received signals, means for generating a second generated signal related in frequency to the second of said received signals, heterodyning means for producing a second beat frequency related to the difference frequency between said second generated signal and said second received signal, heterodyning means for producing a third beat frequency related in frequency to the difference between said first and second received signals, heterodyning means for producing a fourth beat frequency related to the difference frequency between said first and second generated signals, means for comparing the phase of said third and fourth beat frequencies to provide a first position indication representative of the location of said receiving apparatus relative to the source of said first received signal, means for comparing the phase of said fourth beat frequency and said first beat frequency to provide a second position indication, and means for comparing the phase of said fourth beat frequency and said second beat frequency to provide a third position indication.

5. Wave signal receiving apparatus for translating at least two received signals into position indications comprising, means for receiving said signals, means for generating at least two signals respectively related in frequency to the frequencies of the received signals, means for measuring the phase relationship between one of said generated signals and one of said received signals to provide an indication of the location of the receiving apparatus with respect to the source of said one received signal, means for measuring the phase relationship between a second of said generated signals and a second of said received signals to provide an indication of the location of the receiving apparatus with respect to the source of said second received signal, and means for measuring the phase relationship between the received signals to provide an indication of the location of said receiving apparatus relative to both of the sources of said signals.

6. A system for determining the position of a mobile receiving unit which comprises a pair of spaced transmitters for radiating at least two continuous wave signals of stable but different frequencies in order to establish in space a grid-like pattern of circular isophase lines and a pattern of hyperbolic isophase lines, means at said receiving unit for receiving said radiated signals, means at said receiving unit for generating a first generated signal having a frequency related to the frequency of a first of said radiated signals, means jointly responsive to said first generated signal and to the first of said received signals for indicating the location of said receiving unit between a pair of the circular isophase lines effectively produced in space about the location of the transmitter of said first radiated signal as a center point, means at said receiving unit for generating a second generated signal having a frequency related to the second of said radiated signals, means jointly responsive to said second generated signal and to the second of said received signals for indicating the location of said receiving unit between a pair of circular isophase lines effectively produced in space about the transmitter of said second radiated signal as a center point, and means for determining the phase relationship between said first and second received signals to provide an indication of the location of said receiving unit relative to a pair of the hyperbolic isophase lines effectively produced in space between said pair of transmitters.

7. Wave signal receiving apparatus for translating at least two received signals into position indications comprising, means for receiving said signals, means for generating a first generated signal equal in frequency to the frequency of a first of said received signals, means for generating a second generated signal equal in frequency to the frequency of a second of said received signals, means for heterodyning the first generated signal and said second received signal to produce a first beat frequency, means for heterodyning the first and second generated signals to produce a second beat frequency equal in frequency to the first beat frequency, means for comparing the phase of said first and second beat frequencies to provide a first position indication, means for heterodyning the second generated signal and said first received signal to produce a third beat frequency, means for comparing the phase of said second and third beat frequencies to provide a second position indication, means for heterodyning said first and second received signals to produce a fourth beat frequency signal, and means for comparing the phase of said second and fourth beat frequencies to provide a third position indication.

8. Wave signal receiving apparatus for translating at least two received space radiated signals into position indications comprising means for receiving said space radiated signals, a first generating means for producing a first generated signal having a frequency related to that of the first of the received signals, a second generating means for producing a second generated signal having a frequency related to that of the second of the received signals, means including a movable indicator for comparing the phase of said first received signal with said first generated signal to produce a first position indication representative of the location of said receiving apparatus relative to the source of said first received signal, means including a movable indicator for comparing the phase of said second received signal with said second generated signal to produce a second position indication, and means for indicating the differential movement between the movable indicators of both of said phase comparing means to obtain a third position indication.

9. Wave signal receiving apparatus for translating at least two signals received from approximately the same transmitting location into position indications comprising means for receiving each of said space radiated signals, a first generating means for producing a first generated signal having a frequency related to that of the first of the received signals, a second generating means for producing a second generated signal having a frequency related to that of the second of the received signals, means including a movable indicator for comparing the phase of said first received signal with said first generated signal to produce a first position indication representative of the location of said receiving apparatus relative to said transmitting location, means including a movable indicator for comparing the phase of said second received signal with said second generated signal to produce a second position indication representative of the location of the receiving apparatus relative to said transmitting location, and means for indicating the differential movement between the movable indicators of both of said phase comparing means to obtain a third position indication representative of the location of the receiving apparatus relative to said transmitting location.

10. Wave signal receiving apparatus for translating at least two signals received from approximately the same transmitting location into position indications comprising means for receiving said space radiated signals, a first generating means for producing a first generated signal having a frequency related to that of the first of the received signals, a second generating means for producing a second generated signal having a frequency related to that of the second of the received signals, means including a movable indicator for comparing the phase of said first received signal with said first generated signal to produce a first position indication representative of the location of the receiving apparatus relative to said transmitting location, means including a movable indicator for comparing the phase of said second received signal with said second generated signal to produce a second position indication representative of the location of the receiving apparatus relative to said transmitting location, and means including a mechanical differential interconnecting both of said movable indicators for indicating the differential movement between the movable indicators of both of said phase comparing means in order to obtain a coarse indication representative of the location of the receiving apparatus relative to said transmitting location.

11. Wave signal receiving apparatus for translating at least two received space radiated signals into position indications comprising means for receiving said space radiated signals, a first generating means for producing a first generated signal having a frequency related to that of the first of the received signals, a second generating means for producing a second generated signal having a frequency related to that of the second of the received signals, means for comparing the phase of said first received signal with said first generated signal to produce a fine position indication, means for heterodyning said two received signals to provide a first beat frequency signal, means for heterodyning said first and second generated signals to provide a second beat frequency signal, and means for comparing the phase of said first and second beat frequency signals to provide a coarse position indication.

12. Wave signal receiving apparatus for translating at least two received space radiated signals into position indications comprising means for receiving said space radiated signals, a first generating means for producing a first generated signal having a frequency related to that of the first of the received signals, a second generating means for producing a second generated signal having a frequency related to that of the second of the received signals, means for comparing the phase of said first received signal with said first generated signal to produce a fine position indication, means for producing one signal representative of the frequency difference between the two received signals, means for producing another signal representative of the frequency difference between the two generated signals, and means for determining the phase relationship between the last named signal and said one signal to provide a coarse position indication.

13. Wave signal receiving apparatus for translating at least two pairs of received spaced radiated signals into a plurality of position indictations comprising separate means for receiving each pair of said space radiated signals, a first generating means for producing a first generated signal having a frequency related to the frequency of one of the signals of a first pair of said received signals, a second generating means for producing a second generated signal having a frequency related to the frequency of the other signal of said first pair of received signals, means for comparing the phase of said first generated signal and said one received signal to provide a first fine position indication, means for comparing the phase of said other received signal and said second generated signal to provide a second fine position indication, means for developing a first signal representative of the difference frequency between said one received signal and a first signal of the second pair of received signals, a third generating means for producing a third generated signal having a frequency related to said first received signal of said second pair, means for developing a second signal representative of the difference frequency between said first and said third generated signals, means for comparing the phase of said first and second developed signals to provide a first coarse position indication, means for developing a third signal having a frequency representative of the frequency difference between said other received signal of said first pair and the second received signal of said second pair, a fourth generating means for producing a fourth generated signal having a frequency related to said second received signal of said second pair, means for developing a fourth signal having a frequency related to the frequency difference between said second and fourth generated signals, and means for comparing the phase of said third and fourth developed signals to provide a second coarse position indication.

14. Wave signal receiving apparatus for translating at least two pairs of received spaced radiated signals into a plurality of position indications comprising separate receiving means for receiving each pair of signals, filter means associated with each of said separate receiving means for separating the signals of each pair, a first generating means for producing a first generated signal having a frequency related to the frequency of one of the signals of a first pair of said received signals, a second generating means for producing a second generated signal having a frequency related to the frequency of the other signal of said first pair of received signals, means for comparing the phase of said first generated signal and said one received signal to provide a first fine position indication, means for comparing the phase of said other received signal and said second generated signal to provide a second fine position indication, means for developing a first signal representative of the difference frequency between said one received signal and a first signal of the second pair, a third generating means for producing a third generated signal having a frequency related to said first received signal of said second pair, means for developing a second signal representative of the difference frequency between said first and said third generated signals, means for comparing the phase of said first and second developed signals to provide a first coarse position indication, means for developing a third signal having a frequency representative of the frequency difference between said other received signal of said first pair and the second received signal of said second pair, a fourth generating means for producing a fourth generated signal having a frequency related to said second received signal of said second pair, means for developing a fourth signal having a frequency related to the frequency difference between said second and fourth generated signals, and means for comparing the phase of said third and fourth developed signals to provide a second coarse position indication.

15. In a position determining system comprising a pair of spaced transmitting units, at least one pair of transmitters for radiating signals of different frequencies, said transmitters being disposed at the same transmitting unit, a receiving unit including means for receiving the radiated signals, signal generating means at said receiving unit for producing a signal related to the frequency of the signal radiated by one of the transmitters, heterodyning means for developing a first beat frequency signal corresponding to the difference frequency between the signals radiated by the pair of transmitters, heterodyning means at least in part responsive to said generated signal for developing a second beat frequency signal equal in frequency to the first beat frequency signal, and means for indicating the phase relationship between said first and second beat frequency signals.

16. In a position determining system comprising a pair of spaced transmitting units, at least one pair of transmitters for radiating signals of different frequencies, said transmitters being disposed at the same transmitting unit, a receiving unit including means for receiving the radiated signals, a pair of signal generating means at said receiving unit for producing a pair of generated signals each having a frequency related to the frequency of a different one of the signals radiated by said pair of transmitters, heterodyning means for developing a first beat frequency signal corresponding to the difference frequency between the signals radiated by said pair of transmitters, heterodyning means jointly responsive to the pair of generated signals for developing a second beat frequency signal equal in frequency to the first beat frequency signal, and means for indicating the phase relationship between said first and second beat frequency signals.

17. A position determining system comprising a pair of spaced transmitting units, at least two pairs of transmitters for radiating signals of different frequencies, said transmitters of each pair being respectively disposed at different transmitting units, a receiving unit including means for receiving the radiated signals, a pair of generating means at said receiving unit for producing generated signals respectively related to the frequencies of the signals radiated by one of the transmitters at each of the transmitting units, a pair of heterodyning means for developing a first pair of beat frequency signals corresponding to the respective difference frequencies between the signals radiated by said pairs of transmitters, a pair of heterodyning means each at least in part responsive to a different one of said generated signals for developing a second pair of beat frequency signals each equal in frequency to one of the first pair of beat frequency signals, and means for indicating the phase relationships between the signals of equal frequency of said first and second beat frequency signals.

18. A position determining system comprising a pair of spaced transmitting units, at least two pairs of transmitters for radiating signals of different frequencies, said transmitters of each pair being respectively disposed at different transmitting units, a receiving unit including means for receiving the radiated signals, a plurality of generating means at said receiving unit for producing pairs of generated signals each having a frequency related to the frequency of the signal radiated by one of the transmitters, a pair of heterodyning means for developing a first pair of beat frequency signals respectively corresponding to the difference frequency between the signals radiated by said pairs of transmitters, a pair of heterodyning means each of which is jointly responsive to one of the pairs of generated signals for developing a second pair of beat frequency signals respectively associated with one of the first pair of beat frequency signals, and means for indicating the phase relationships between the associated ones of said first and second pairs of beat frequency signals.

19. In a position determining system comprising a pair of spaced transmitting units, at least one pair of transmitters for radiating signals of different frequencies, said transmitters being disposed at the same transmitting station, a receiving unit including means for receiving the radiated waves, a pair of generating means at said receiving unit for producing a pair of generated signals each having a frequency related to the frequency of the signal radiated by one of the transmitters, means for indicating the phase relationship between a first of the generated signals and the signal radiated by a first of the transmitters to provide a first position indication, heterodyning means for developing a first beat frequency signal corresponding to the difference frequency between the signals radiated by the pair of transmitters, heterodyning means at least in part responsive to said first generated signal for developing a second beat frequency signal equal in frequency to the first beat frequency signal, and means for indicating the phase relationship between said first and second beat frequency signals to provide a second position indication.

20. A system for determining the position of a mobile receiving unit which comprises a pair of spaced transmitting units each of which includes a pair of transmitters for radiating continuous wave signals of different frequencies, means at said receiving unit for receiving said signals, means at said receiving unit for generating a first signal having a frequency related to the frequency of a first of the signals radiated by one of said transmitting units, means jointly responsive to said first generated signal and to said first received signal for providing a first indication of the location of said receiving unit relative to the location of said one transmitting unit, means at said receiving unit for generating a second signal having a frequency related to one of the signals radiated by the other of said transmitting units, means jointly responsive to said second generated signal and to said one signal for providing a second indication representative of the location of said receiving unit relative to said other transmitting unit, heterodyning means responsive to the signals generated by the pair of transmitters at said one unit for providing a first beat frequency signal, means at least in part responsive to said first beat frequency signal for providing a third indication representative of the location of the receiving unit relative to said one unit, heterodyning means responsive to signals generated by the pair of transmitters at said other unit for producing a second beat frequency signal, and means at least in part responsive to said second beat frequency signal for providing a fourth indication representative of the position of said receiving unit relative to said other transmitting unit.

21. A system for determining the position of a mobile receiving unit which comprises a pair of spaced transmitting units each of which includes a pair of transmitters for radiating continuous wave signals of different frequencies in order to establish in space a grid-like pattern of closely spaced circular isophase lines and a pattern of widely spaced circular isophase lines, means at said receiving unit for receiving said signals, means at said receiving unit for generating a first signal having a frequency related to the frequency of a first of the signals radiated by one of said transmitting units, means jointly responsive to said first generated signal and to said first received signal for indicating the location of said receiving unit between a pair of relatively closely spaced circular isophase lines effectively produced in space about the location of said one transmitting unit as a center point, means at said receiving unit for generating a second signal having a frequency related to one of the signals received from the other of said transmitting units, means jointly responsive to said second generated signal and to said one received signal for indicating the location of said receiving unit between a pair of relatively closely spaced circular isophase lines effectively produced in space about said other transmitting unit as a center point, and means for indicating the position of said receiving unit relative to a pattern of widely spaced isophase lines spaced apart by distances related to the difference frequency between the continuous wave signals radiated by each pair of transmitters at each of said transmitting units.

22. A system for determining the position of a mobile receiving unit which comprises a pair of spaced transmitting units each of which includes a pair of transmitters for radiating continuous wave signals of different frequencies, means at said receiving unit for receiving said signals, means at said receiving unit for generating a first signal having a frequency related to the frequency of the received signal radiated by the first transmitter of one of said transmitting units, means jointly responsive to said first generated signal and to said first received signal for providing a first indication of the location of said receiving unit relative to the location of said one transmitting unit, means at said receiving unit for generating a second signal having a frequency related to a second received signal radiated by the first transmitter at the other of said transmitting units, means jointly responsive to said second generated signal and to said second received signal for providing a second indication representative of the location of said receiving unit relative to said other transmitting unit, other generating means for developing third and fourth signals having frequencies respectively equal to the received signals radiated by the second transmitter at each of said transmitting units, heterodyning means responsive to the received signals radiated by the pair of transmitters at said one unit for providing a first beat frequency signal, means jointly responsive to said first generated signal and said third generated signal for providing a second beat frequency signal, means for comparing the phase of the first and second beat frequency signals to provide a third position indication representative of the position of the mobile receiving unit relative to the first transmitting unit, heterodyning means responsive to the received signals radiated from said other unit for producing a third beat frequency signal, means jointly responsive to the second generated signal and the fourth generated signal for producing a fourth beat frequency signal, and means for comparing the phase of the third and fourth beat frequency signals to provide a fourth position indication representative of the position of the receiving unit relative to the other transmitting unit.

23. Wave signal receiving apparatus for translating two space radiated signals into position indications comprising, means for receiving said space radiated signals, a signal generating means for producing a generated signal having a frequency related to one of the received signals, means jointly responsive to said one received signal and to said generated signal for providing a first position indication representative of the location of said receiving apparatus relative to the source of said one signal, and means responsive at least in part to both of said received signals for providing a second position indication.

24. Wave signal receiving apparatus for translating two space radiated signals into position indications comprising, means for receiving said space radiated signals, means for separating the received signals, a signal generating means for producing a generated signal having a frequency related to one of the received signals, means jointly responsive to said one received signal and to said generated signal for providing a first position indication representative of the location of said receiving apparatus relative to the source of said one signal, and means responsive at least in part to both of said received signals for providing a second position indication to facilitate resolution of the ambiguity of said first position indication.

25. Wave signal receiving apparatus for translating at least two space radiated signals received from approximately the same transmitting location into position indications comprising, means for receiving said space radiated signals, a first signal generating means for producing a first generated signal having a frequency related to that of a first of the received signals, means jointly responsive to said first generated signal and to said first received signal to provide a first position indication indicative of the location of the receiving apparatus relative to said transmitting point, a second signal generating means for producing a second generated signal having a frequency related to that of a second of said received signals, and means jointly responsive to said first and second generated signals and to said first and second received signals for providing a coarse position indication representative of the location of said receiving apparatus relative to said transmitting point.

26. Wave signal receiving apparatus for translating at least two space radiated signals received from approximately the same transmitting point into position indications comprising, means for receiving said space radiated signals, means for separating the received signals, a first signal generating means for producing a first generated signal having a frequency squal to that of a first of the received signals, means jointly responsive to said first generated signal and to said first received signal to provide a first position indication indicative of the location of the receiving apparatus relative to said transmitting point, a second signal generating means for producing a second generated signal having a frequency equal to that of a second of said received signals, and means jointly responsive to said first and second generated signals and to said first and second received signals for providing a coarse position indication indicative of the location of said receiving apparatus relative to said transmitting point.

27. In a position determining system comprising a pair of spaced transmitting units, a pair of transmitters disposed at each of said units for radiating signals of different frequencies, a receiving unit including means for receiving the radiated signals, a plurality of signal generating means at said receiving unit for producing generated signals having frequencies each respectively related to a different one of the received signals, means jointly responsive to a first of the generated signals and to a first of the signals received from a first of said transmitting units for producing a first position indication representative of the position of said receiving means relative to said first transmitting unit, means jointly responsive to a second of the generated signals and to a first of the signals received from a second of said transmitting units for providing an indication of the location of said receiving means relative to said second transmitting unit; means jointly responsive to both of the signals received from said first transmitting unit and to the generated signals having frequencies related thereto for providing a coarse indication of the location of said receiving means relative to said first transmitting unit, and means jointly responsive to both of the signals received from said second transmitting unit and to the generated signals having frequencies related thereto for producing a coarse indication of the position of the receiving means relative to said second transmitting unit.

28. Wave signal receiving apparatus for translating a plurality of space radiated signals into position indications comprising, means for receiving said space radiated signals, a first signal generating means for producing a first generated signal having a frequency related to a first of the received signals, a second signal generating means for producing a second generated signal having a frequency related to a second of the received signals, means jointly responsive to said first received signal and to said generated signal for providing a first position indication representative of the location of said receiving apparatus relative to the source of said one signal, means jointly responsive to said second received signal and to said second generated signal for producing a second indication representative of the location of said receiving apparatus relative to the source of said second received signal, and means responsive at least in part to said first and second received signals for providing at least one additional position indication to facilitate resolution of the ambiguity of said first and second position indications.

References Cited in the file of this patent

UNITED STATES PATENTS

| | | |
|---|---|---|
| 1,495,616 | Simpson | May 27, 1924 |
| 2,141,282 | Southworth et al. | Dec. 27, 1938 |
| 2,218,907 | Donnelly et al. | Oct. 22, 1940 |
| 2,408,773 | Goodall | Oct. 8, 1946 |

FOREIGN PATENTS

| | | |
|---|---|---|
| 1,048,082 | France | July 29, 1953 |